(12) United States Patent
Yano et al.

(10) Patent No.: US 12,216,696 B2
(45) Date of Patent: Feb. 4, 2025

(54) CLASSIFICATION SYSTEM, METHOD, AND PROGRAM

(71) Applicant: NEC Corporation, Tokyo (JP)

(72) Inventors: Taro Yano, Tokyo (JP); Kunihiro Takeoka, Tokyo (JP); Masafumi Oyamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/276,378

(22) PCT Filed: Feb. 26, 2021

(86) PCT No.: PCT/JP2021/007385
§ 371 (c)(1),
(2) Date: Aug. 8, 2023

(87) PCT Pub. No.: WO2022/180796
PCT Pub. Date: Sep. 1, 2022

(65) Prior Publication Data
US 2024/0119079 A1    Apr. 11, 2024

(51) Int. Cl.
*G06F 7/00*      (2006.01)
*G06F 16/00*     (2019.01)
(Continued)

(52) U.S. Cl.
CPC ............ *G06F 16/35* (2019.01); *G06F 16/383* (2019.01)

(58) Field of Classification Search
None
See application file for complete search history.

(56) References Cited

U.S. PATENT DOCUMENTS

| | | | |
|---|---|---|---|
| 9,928,448 B1* | 3/2018 | Merler | G06F 18/2415 |
| 2012/0269436 A1* | 10/2012 | Mensink | G06V 10/764 |
| | | | 382/180 |

(Continued)

FOREIGN PATENT DOCUMENTS

| | | |
|---|---|---|
| JP | H09-006799 A | 1/1997 |
| JP | 2012-155524 A | 8/2012 |

(Continued)

OTHER PUBLICATIONS

International Search Report for PCT Application No. PCT/JP2021/007385, mailed on May 18, 2021.

(Continued)

*Primary Examiner* — Tuan A Pham

(57) ABSTRACT

The input means 181 accepts inputs of test data, a hierarchical structure in which a node of bottom layer represents a target class, and a classification score of a seen class as the classification score indicating a probability that the test data is classified into each class. The unseen class score calculation means 182 calculates the classification score of an unseen class based on uniformity of the classification score of each seen class. The matching score calculation means 183 calculates a matching score indicating similarity between the test data and each class label. The final classification score calculation means 184 calculates a final classification score indicating a probability that the test data is classified into the class so that the larger the classification score of each class, and the matching score, the larger the final classification score.

9 Claims, 15 Drawing Sheets

(51) Int. Cl.
    *G06F 16/35*         (2019.01)
    *G06F 16/383*       (2019.01)

(56) References Cited

U.S. PATENT DOCUMENTS

| | | |
|---|---|---|
| 2013/0304743 A1 | 11/2013 | Kurokawa |
| 2021/0056364 A1 | 2/2021 | Toizumi |
| 2021/0357677 A1* | 11/2021 | Hirayama ............. G06F 18/243 |

FOREIGN PATENT DOCUMENTS

| | | |
|---|---|---|
| JP | 2020-052644 A | 4/2020 |
| JP | 2021-022343 A | 2/2021 |
| WO | 2019/171416 A1 | 9/2019 |

OTHER PUBLICATIONS

English translation of Written opinion for PCT Application No. PCT/JP2021/007385, mailed on May 18, 2021.

* cited by examiner

FIG. 6
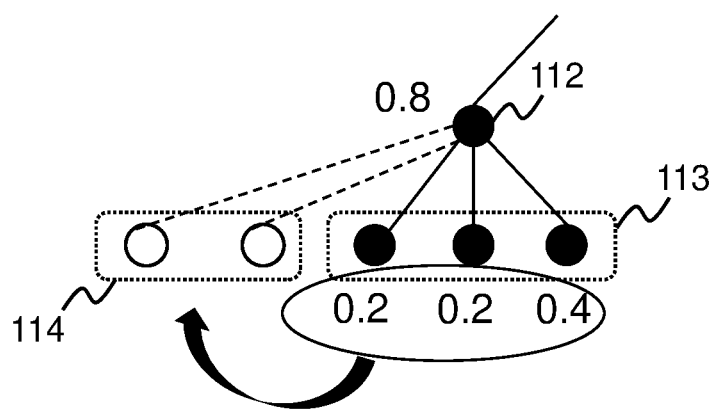
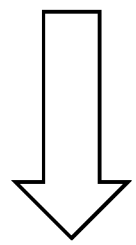
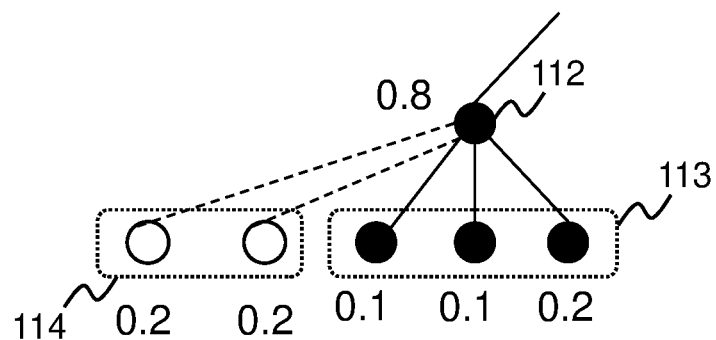

CLASSIFICATION SYSTEM, METHOD, AND PROGRAM

This application is a National Stage Entry of PCT/JP2021/007385 filed on Feb. 26, 2021, the contents of all of which are incorporated herein by reference, in their entirety.

TECHNICAL FIELD

This invention relates to a classification system, a classification method, and a classification program for classifying document data.

BACKGROUND ART

Various methods are known to classify a large amount of data by labeling the data. As data classification methods, there are a flat approach which ignores the hierarchical structure, and a top-down approach which performs classification by sequentially branching out the hierarchical structure from the top node, for example. It should be noted that these methods assume the existence of labeled data for all classes.

On the other hand, with the passage of time, new classes may arise that need to be classified. Such new classes generally do not have initially labeled data. A class for which labeled data do not exist is sometimes referred to as an unseen class. A class for which labeled data exist is sometimes referred to as a seen class. It is required to be able to classify data appropriately even for such an unseen class.

With the above commonly known methods, it is difficult to appropriately classify data into a new class. To address this problem, patent literature 1 describes an image classification system that identifies an unknown image. The image classification system described in patent literature 1 calculates a probability that an input image corresponds to a known image whose label is known, calculates a likelihood that the input image is classified to an unknown image whose label is unknown and a likelihood that the input image is classified to a known image, and corrects each likelihood by the calculated probability.

CITATION LIST

Patent Literature

PTL 1: International Publication No. 2019/171416

SUMMARY OF INVENTION

Technical Problem

When attaching a predicted label indicating the contents of the class to the data (hereinafter sometimes referred to as inference) using trained AI (Artificial Intelligence) or other means, as described above, data that should be classified into a class for which no labeled data exist may appear. For example, suppose that "bubble milk tea" is set as a class to classify a product due to the popularity of bubble milk tea. However, since there is no data labeled with the new class "bubble milk tea" initially, it is difficult for a general hierarchical classifier to classify the data to be classified into an unseen class.

The system described in patent literature 1 improves the accuracy of estimated labels by calculating a likelihood of unknown images as low as a probability of a known image is high. On the other hand, since in the situation where document data is classified into an unseen class, a probability that document data is classified into the unseen class is low to begin with, if a process is performed to further lower this low probability, the probability that document data is classified into the unseen class is further reduced. Accordingly, it is difficult to classify document data into the unseen class.

Therefore, it is an exemplary object of the present invention to provide a classification system, a classification method, and a classification program that can also appropriately classify data to be classified into an unseen class for which no classified document data exists.

Solution to Problem

The classification system according to the present invention includes input means for accepting inputs of test data that is document data to be classified, a hierarchical structure in which a node of bottom layer represents a class being a classification destination, and a classification score of a seen class for which the document data already classified exists as the classification score indicating a probability that the test data is classified into each class in the hierarchical structure, unseen class score calculation means for calculating the classification score of an unseen class for which the document data already classified does not exist based on uniformity of the classification score of each seen class in the hierarchical structure, matching score calculation means for calculating a matching score indicating similarity between the test data and a class label of the seen class or a class label of the unseen class, and final classification score calculation means for calculating a final classification score indicating a probability that the test data is classified into the class so that the larger the classification score of the seen class or the classification score of the unseen class, and the matching score, the larger the final classification score.

The classification method according to the present invention includes accepting inputs of test data that is document data to be classified, a hierarchical structure in which a node of bottom layer represents a class being a classification destination, and a classification score of a seen class for which the document data already classified exists as the classification score indicating a probability that the test data is classified into each class in the hierarchical structure, calculating the classification score of an unseen class for which the document data already classified does not exist based on uniformity of the classification score of each seen class in the hierarchical structure, calculating a matching score indicating similarity between the test data and a class label of the seen class or a class label of the unseen class, and calculating a final classification score indicating a probability that the test data is classified into the class so that the larger the classification score of the seen class or the classification score of the unseen class, and the matching score, the larger the final classification score.

The classification program according to the present invention causes a computer to execute input process of accepting inputs of test data that is document data to be classified, a hierarchical structure in which a node of bottom layer represents a class being a classification destination, and a classification score of a seen class for which the document data already classified exists as the classification score indicating a probability that the test data is classified into each class in the hierarchical structure, unseen class score calculation process of calculating the classification score of an unseen class for which the document data already classified does not exist based on uniformity of the classification score of each seen class in the hierarchical structure, matching score calculation process of calculating a matching score indicating similarity between the test data and a class label of the seen class or a class label of the unseen class, and final classification score calculation process of calculating a final classification score indicating a probability that the test data is classified into the class so that the larger the classification score of the seen class or the classification score of the unseen class, and the matching score, the larger the final classification score.

Advantageous Effects of Invention

According to this invention, the data to be classified can be also appropriately classified into an unseen class for which no classified document data exists.

BRIEF DESCRIPTION OF DRAWINGS

FIG. 6 It depicts an explanatory diagram showing an example of a process of calculating a classification score for an unseen class.

DESCRIPTION OF EMBODIMENTS

Figure 1:
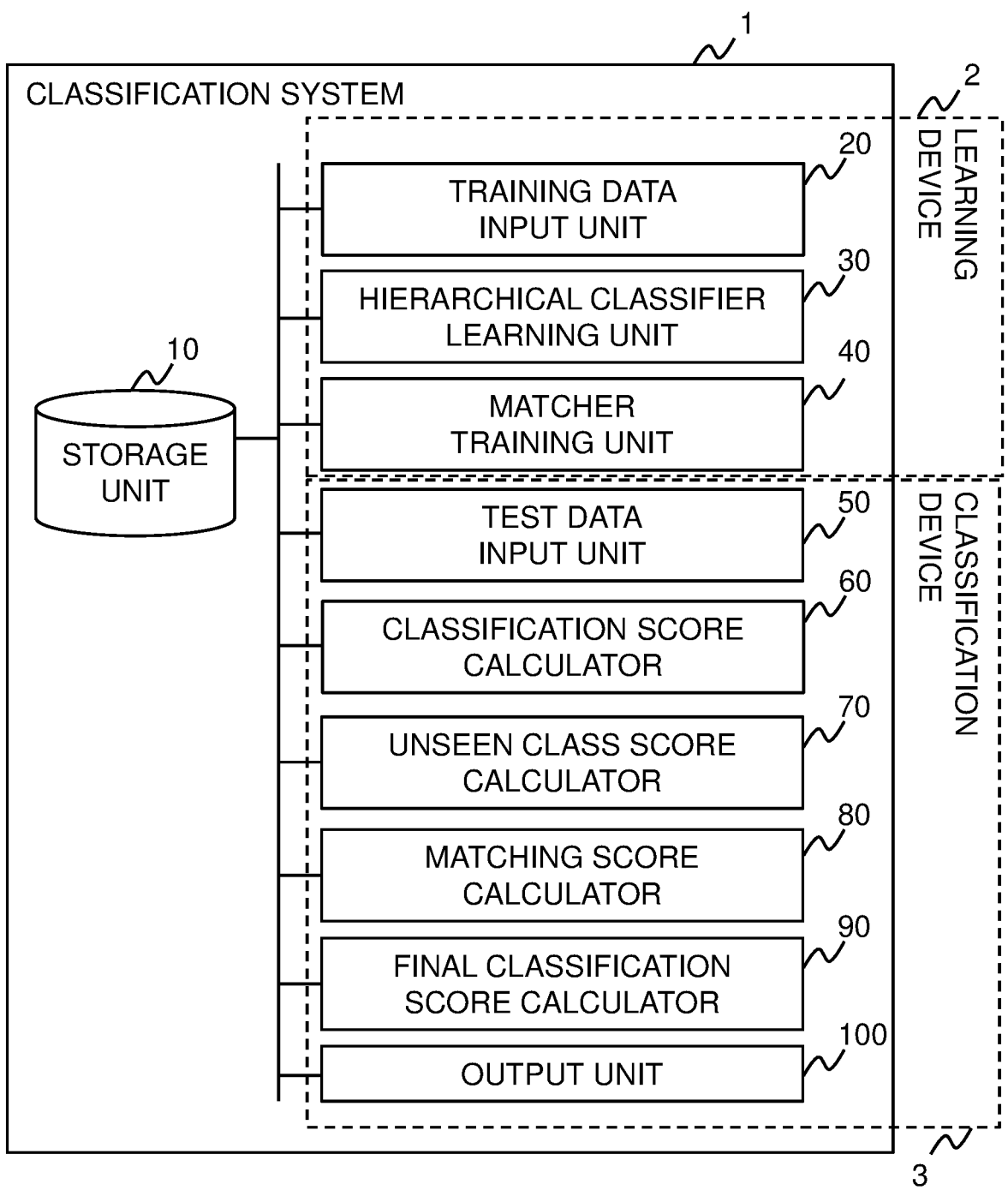
FIG. 1 It depicts a block diagram showing a configuration example of an exemplary embodiment of a classification system according to the present invention.

Hereinafter, an exemplary embodiment of the present invention will be explained with reference to the drawings. FIG. 1 is a block diagram showing a configuration example of an exemplary embodiment of a classification system according to the present invention.

Figure 2:
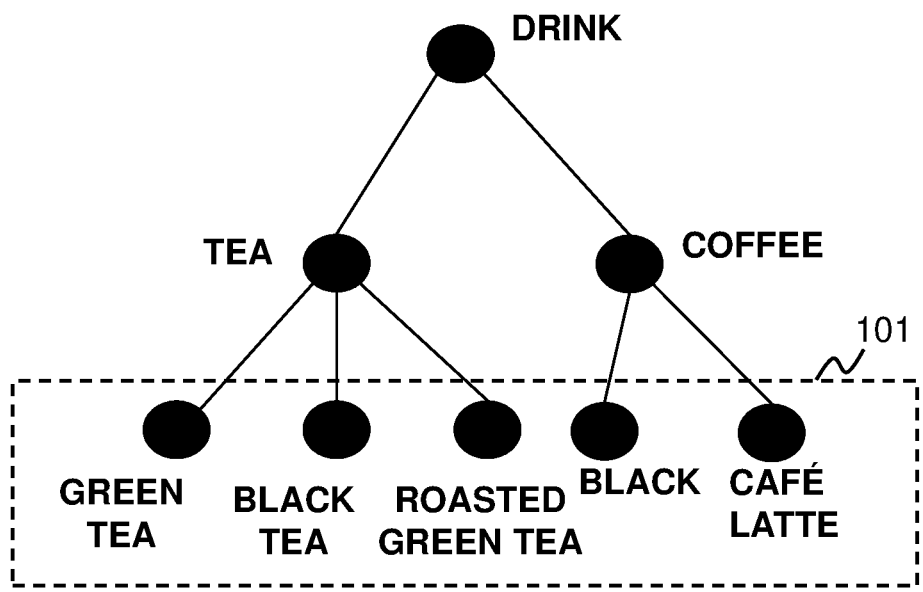
FIG. 2 It depicts an explanatory diagram showing an example of a hierarchical structure.

First of all, a situation in which the classification system of this exemplary embodiment is used is explained. In this exemplary embodiment, a classification of document data is represented by a hierarchical structure, and the node of bottom layer (leaf node) represents the class to be classified. The upper node in the hierarchical structure corresponds to the parent node, and the lower node connected to the parent node corresponds to the child node. FIG. 2 is an explanatory diagram showing an example of a hierarchical structure.

In the example shown in FIG. 2, the class "drink" exists in the top node, and when the class "drink" is the parent node, the child nodes are the classes "tea" and "coffee". In addition, the nodes 101 of the bottom layer represent the classes.

In the following explanation, the linguistic meaning of the class attached to the data to be classified is denoted as a class label. Among class labels, a label assigned manually is sometimes distinguished as a ground truth label, and a label assigned by AI or other means is sometimes described as a predicted label. Classifying data into a class and attaching a class label to data are synonymous. Data with a ground truth label is also described as training data. The training data can be said to be data that has already been classified into each class.

Data without a ground truth label is denoted as test data. The test data is the data to be classified in this exemplary embodiment. Without distinction between training data and test data, both are referred to as all data or simply data.

Figure 3:
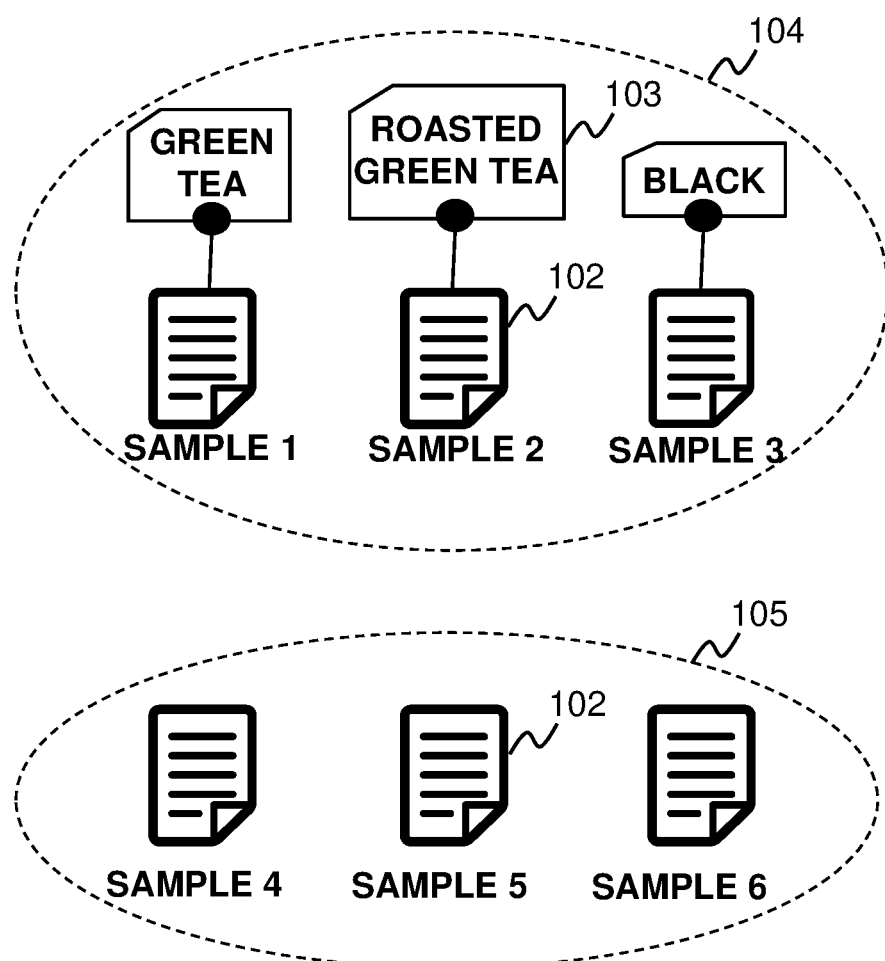
FIG. 3 It depicts an explanatory diagram showing an example of data.

FIG. 3 is an explanatory diagram showing an example of data used in this exemplary embodiment. FIG. 3 illustrates an example of training data 104 in which a ground truth label 103 is attached to document data 102, and test data 105 in which a ground truth label is not attached to document data 102.

This exemplary embodiment assumes a situation where a class for which no training data exists appears during inference (in other words, it is included in the test data). For example, this is a situation where "bubble milk tea" was manually set in the product classification hierarchy because bubble milk tea is popular, but no data exists yet.

As described above, a class for which no training data exist is noted as an unseen class, and a class for which training data exist is noted as a seen class. In a general hierarchical classifier, it is impossible to classify test data into an unseen class. This is because a general hierarchical classifier classifies test data into one of the seen classes, and thus is not designed to classify test data into an unseen class in the first place.

Figure 4:
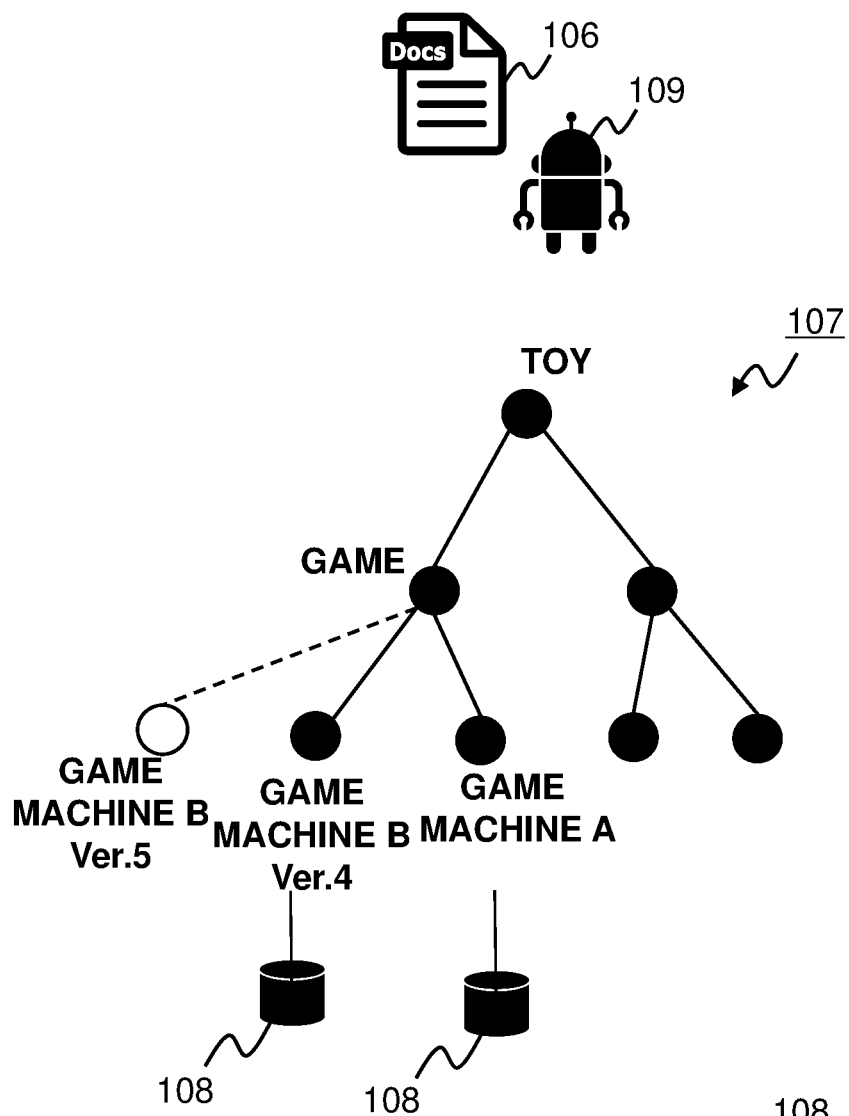
FIG. 4 It depicts an explanatory diagram showing an example of an operation of a general hierarchical classifier.

FIG. 4 is an explanatory diagram showing an example of an operation of a general hierarchical classifier. The example shown in FIG. 4 illustrates a situation where one test data 106 (sometimes written as test sample) among multiple test data is classified into the classes of the hierarchical classification 107. In the hierarchical classification 107, it is assumed that "Game Machine A" and "Game Machine B ver. 4" exist as seen classes, and "Game Machine B ver. 5" is newly added as an unseen class. In other words, training data 108 is classified into each seen class, and no training data is classified into an unseen class.

It is assumed that the test sample illustrated in FIG. 4 includes a product name and a description of the game software for game machine B ver. 5. When classifying the test sample, the general hierarchical classifier 109 tries to classify the test sample into the seen classes for which the training data 108 exists. Therefore, even if the test sample includes "game machine B ver. 5", it will be classified into the seen class "game machine B ver. 4".

The purpose of this exemplary embodiment is to appropriately classify test data (a test sample) into unseen classes that do not include such training data.

As illustrated in FIG. 1, the classification system 1 of this exemplary embodiment includes a storage unit 10, a training data input unit 20, a hierarchical classifier training unit 30, a matcher training unit 40, a test data input unit 50, a classification score calculator 60, an unseen class score calculator 70, a matching score calculator 80, a final classification score calculator 90, and an output unit 100.

The storage unit 10 stores various information used by the classification system 1 for processing. For example, the storage unit 10 may store a hierarchical classifier learned by the hierarchical classifier learning unit 30 and a matcher learned by the matcher learning unit which is described below. The storage unit 10 may also store a hierarchical classifier and a matcher generated by other systems (not shown). The storage unit 10 is realized by a magnetic disk, for example.

The training data input unit 20 accepts input of training data to be used by the hierarchical classifier training unit 30 and the matcher training unit 40. Specific details of the training data are described below.

The hierarchical classifier learning unit 30 learns the hierarchical classifier that classifies test data according to a hierarchical structure based on the input training data. The hierarchical classifier in this exemplary embodiment is implemented as a classifier that outputs a probability (hereinafter referred to as the classification score) that the test data is classified into each class. More specifically, the hierarchical classifier in this exemplary embodiment is implemented as a classifier that outputs a classification score indicating how the test data is classified into each seen class.

The method by which the hierarchical classifier learning unit 30 learns the hierarchical classifier is arbitrary. For example, the hierarchical classifier learning unit 30 may learn the hierarchical classifier using a SVM (support vector machine) that performs binary classification by supervised learning. The hierarchical classifier learning unit 30 stores the hierarchical classifier generated by learning in the storage unit 10.

When a pre-generated hierarchical classifier is used for a classification process described below, the classification system 1 may not include a hierarchical classifier learning unit 30.

The matcher learning unit 40 learns the matcher which inputs a class label indicating the linguistic meaning of the class and a document sample, and outputs a matching score corresponding to similarity between the class label and the document sample.

The content of the similarity calculated by the matcher is arbitrary and for example, a semantic similarity, a string similarity, or a combination of these. An example of the semantic similarity is cosine similarity or Euclidean distance between an embedding vector of the class label and an embedding vector of the document sample, for example. An example of the string similarity is the longest common substring length or an edit distance between the class label and the document sample.

The matcher learning unit 40 learns a matcher that calculates a matching score from these one or more similarities as the overall similarity between the document sample and the class label. The matcher learning unit 40 may learn a matcher that calculates a weighted linear sum of at least one of similarities in either or both semantic similarities between the document samples and the class labels and similarities of the included character strings as a matching score, for example. Further, the matcher learning unit 40 may learn the matcher that calculates the matching score using a sigmoid function that takes the calculated weighted linear sum as an argument.

Figure 5:
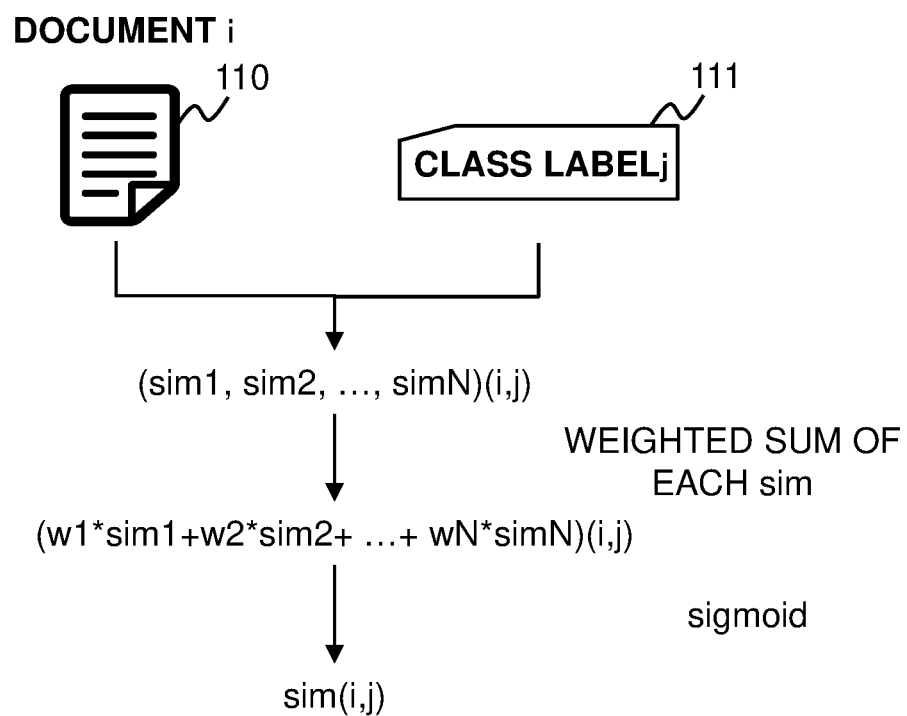
FIG. 5 It depicts an explanatory diagram showing an example of a matcher.

FIG. 5 is an explanatory diagram showing an example of a matcher. The matcher illustrated in FIG. 5 is represented by the function sim (i,j) which calculates a weighted linear sum of N similarities simN from the document samples 110 and the class labels 111, and applies the calculated values to a sigmoid function to calculate the matching score.

The method by which the matcher learning unit 40 learns the matcher is arbitrary. For example, the matcher learning unit 40 may learn a matcher (function) as illustrated in FIG. 5, using an arbitrary error function (loss function) and training data. In this case, for example, binary cross-entropy, which indicates whether document sample i should be classified into class j or not, may be used. The matcher learning unit 40 stores the matcher generated by the training in the storage unit 10.

When a pre-generated matcher is used for the classification process described below, the classification system 1 may not include a matcher learning unit 40.

Since the hierarchical classifier and the matcher are learned by the training data input unit 20, the hierarchical classifier learning unit 30, and the matcher learning unit 40, the device 2 including the training data input unit 20, the hierarchical classifier learning unit 30, and the matcher learning unit 40 can be called a learning device.

The test data input unit 50 accepts input of a hierarchical structure including document data to be classified (i.e., test data) and classes being a classification destination. The test data input unit 50 may, for example, read a hierarchical classifier from the storage unit 10 as input for the hierarchical structure. The test data input here may be data that is considered to be classified into a seen class or unseen class.

The classification score calculator 60 calculates a probability that input test data will be classified into each seen class (i.e., a classification score of the seen class). In this exemplary embodiment, the classification score calculator 60 applies the input test data to the hierarchical classifier to calculate the classification score for each seen class.

Thus, the test data, the hierarchical structure, and the classification score are input by the test data input unit 50 and the classification score calculator 60.

The unseen class score calculator 70 calculates classification scores for unseen classes. As described above, a general hierarchical classifier does not output a probability of classifying test data into a class for which no classified document data exists (i.e., unseen class).

Therefore, in this exemplary embodiment, the unseen class score calculator 70 allocates the classification scores of the seen classes to the unseen classes. Specifically, the unseen class score calculator 70 calculates the classification score of the unseen class based on uniformity of the classification score of each seen class in the input hierarchical structure. At this time, the unseen class score calculator 70 calculates the classification score of the unseen class so that the more uniform the classification score of each seen class, the higher the classification score of the unseen class.

The more the hierarchical classifier gets lost in classification, the less likely it is that classification score will be concentrated in one class, and thus the classification score should be uniform in each class. In this situation, since it is assumed that the input test data is not test data that should be classified into a seen class (i.e., test data that should be classified into an unseen class), it is thought that increasing the classification score for the unseen class is appropriate.

When calculating a classification score of an unseen class, it is necessary to ensure that the relationship of the classification scores in the entire hierarchical structure is appropriate. Therefore, the unseen class score calculator 70 allocates classification scores of the seen classes under the parent node of the unseen classes for which the classification scores are calculated to the classification scores of the unseen class so that the sum of the classification scores of the seen classes under the parent node and the sum of the classification scores of the unseen classes under the parent node is equal.

When there are multiple unseen classes, since it is difficult to determine to which unseen class should be allocated, the unseen class score calculator 70 may allocate the classification scores of the seen classes equally to the classification scores of the unseen classes.

FIG. 6 is an explanatory diagram showing an example of a process of calculating a classification score for an unseen class. FIG. 6 shows an example of a partial extraction of the hierarchical structure. The example shown in FIG. 6 indicates that the classification score of the parent node 112 was calculated to be 0.8 and the classification scores of the three child nodes 113 of the seen class under the parent node were calculated to be 0.4, 0.2, and 0.2, by the hierarchical classifier, respectively. The classification scores have not been calculated for the two child nodes 114 of the unseen class under the parent node 112.

The unseen class score calculator 70 allocates a uniform classification score to the unseen classes under the same parent node. The example shown in FIG. 6 indicates that the unseen class score calculator 70 calculates a classification score of 0.2 for each of the two child nodes 114 and allocates the classification scores of the seen classes to them.

Hereinafter, a specific example of how the unseen class score calculator 70 calculates the classification scores of unseen classes is explained. In the following specific example, KL divergence is used for determining the uniformity of the classification score. Here, the parent node is denoted as s, and the child node in the i-th unseen class of node s is denoted as $N(s)_i$. $c(s)$ is the entire set of child nodes of seen class at node s. In this case, the classification score $p(N(s)_i|x,s)$ of the child node $N(s)_i$ can be calculated by Equation 1, illustrated below. The node s corresponds to the parent node 112 in FIG. 6, the child node $N(s)_i$ corresponds to one of the child nodes 114 in FIG. 6, and $c(s)$ corresponds to the child nodes 113.

[Math. 1]

$$p(N(s)_i | x, s) = \frac{1}{|N(s)|} \cdot \frac{1}{1 + \exp\left\{\frac{KL(p(c|x,s) \| p_{uniform}(c|x,s)) - ths}{T}\right\}} \quad \text{(Equation 1)}$$

$$c \in C(s)$$

In Equation 1, KL represents the KL divergence and $p_{uniform}$ represents a uniform distribution. T is a parameter that represents gradualness of allocation change to classification scores of unseen classes, and ths indicates a value of the KL divergence when the classification score of the unseen class is equal to the classification score of the seen class. Both T and ths may be predetermined by the user, etc., or they may be determined from training data.

For Equation 1, since the more uniform the classification probability of the seen class, the smaller the value of the KL divergence, the smaller the value of the argument of exp. Therefore, as the value of the term in exp approaches 0, the denominator of the right-hand side approaches 1, resulting in a larger classification score for the unseen class. Therefore, the unseen class score calculator 70 may calculate the classification score of the unseen class using Equation 1 illustrated above.

The matching score calculator 80 calculates similarity (hereinafter referred to as the matching score) between the input test data and a class label of the seen class or a class label of the unseen class. Specifically, the matching score calculator 80 calculates the matching score by applying the class label of each class and the test data to the matcher described above. The matching score calculated in this way can be said to be an indicator of how similar the class label and the document sample are in terms of string or semantics for each class.

The matching score calculator 80 calculates the values used to calculate the similarity in the matcher from the input test data and class label, respectively, and applies the calculated value to the matcher to calculate a matching score indicating the overall similarity.

Figure 7:
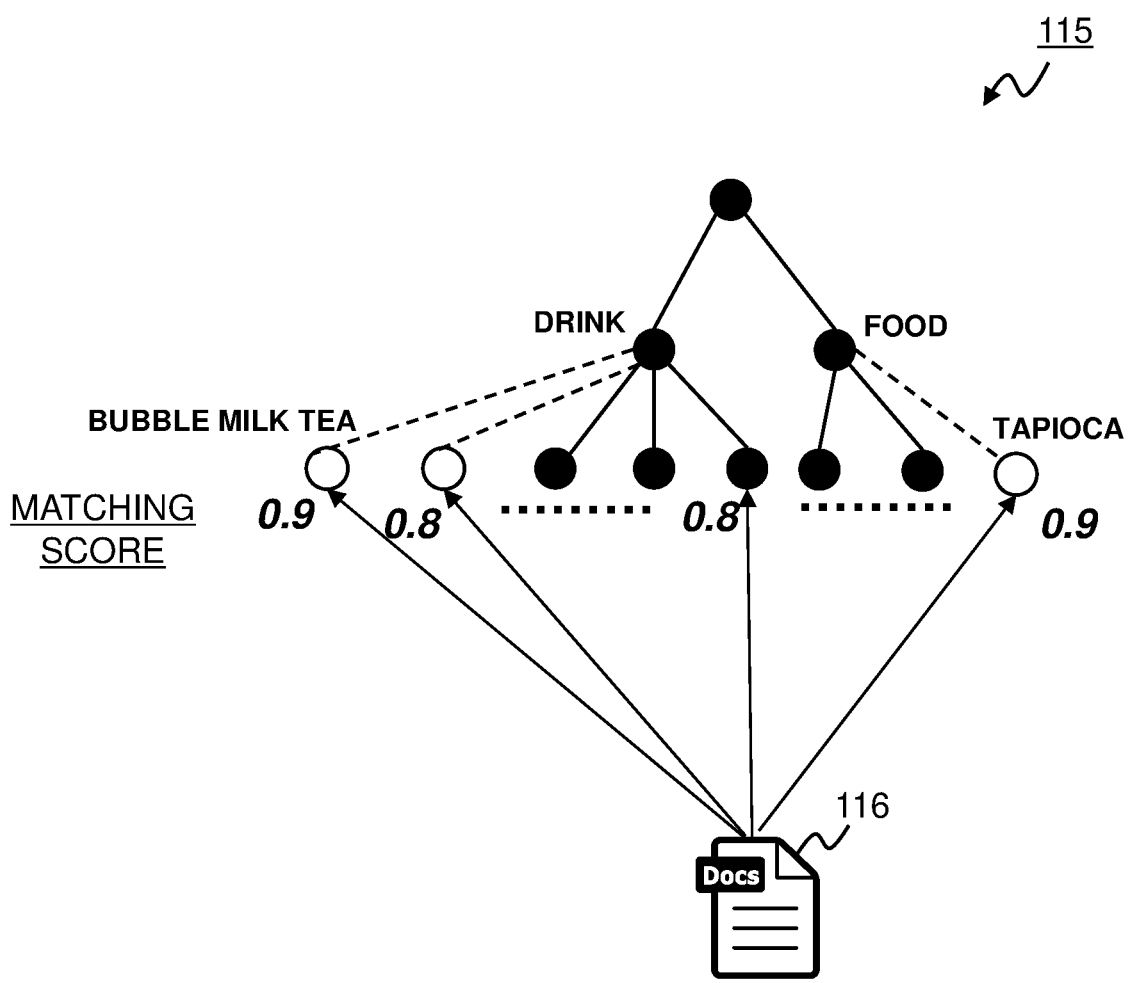
FIG. 7 It depicts an explanatory diagram showing an example of a process of calculating a matching score.
Figure 8:
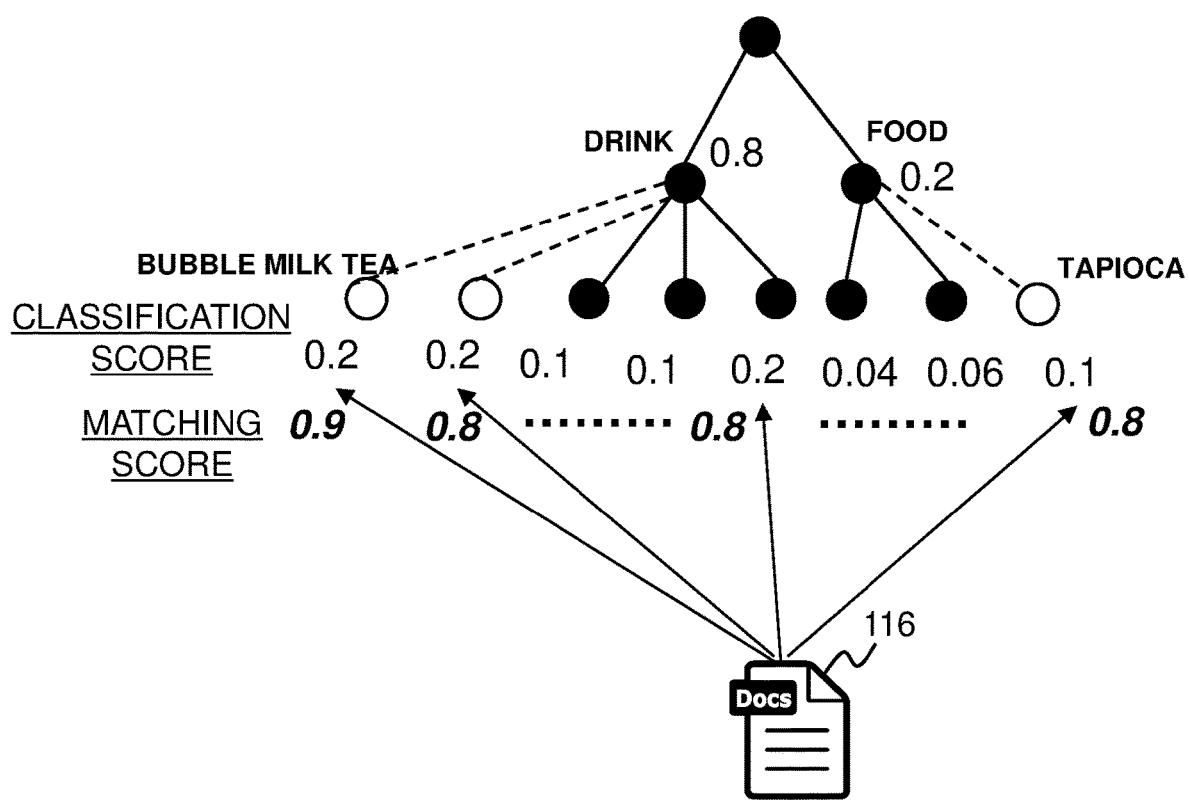
FIG. 8 It depicts an explanatory diagram showing an example of a process of calculating the final classification score.

FIG. 7 is an explanatory diagram showing an example of a process of calculating a matching score. The hierarchical structure 115 illustrated in FIG. 7 is a hierarchical structure showing a food and drink classification, with black circles indicating seen classes and white circles indicating unseen classes. It is assumed that the input test data 116 includes a sentence "XX company low calorie bubble latte".

The matching score calculator 80 calculates the matching score as similarity between the test data and the class label. In this case, the matching score is calculated higher for the class of "tapioca" classified as food and the class of "bubble milk tea" classified as drink than other classes.

The final classification score calculator 90 calculates a probability (hereinafter referred to as the final classification score) that the test data will be classified into a class based on the calculated classification score and matching score. Specifically, the final classification score calculator 90 calculates the final classification score so that the larger the classification score of the seen class or the classification score of the unseen class, and the matching score, the larger the final classification score. The method of calculating the final classification score is arbitrary.

The final classification score calculator 90 may calculate the final classification score by multiplying the classification score and the matching score, for example. The final classification score calculator 90 may also predefine a function f that takes the classification score as an input and outputs a value determined based on magnitude of the classification score. The final classification score calculator 90 may then calculate the final classification score by multiplying a value calculated by applying the classification score for each class to the function f and the matching score. The function f may be identity mapping or a step function, for example.

FIG. 8 to FIG. 11 illustrate explanatory diagrams showing an example of a process of calculating the final classification score. For example, it is assumed that, as a result of the process illustrated in FIG. 6 and FIG. 7, the classification score and the matching score are calculated as the values illustrated in FIG. 8. The final classification score calculator 90 calculates the final classification score based on the calculated classification score and matching score.

Figure 9:
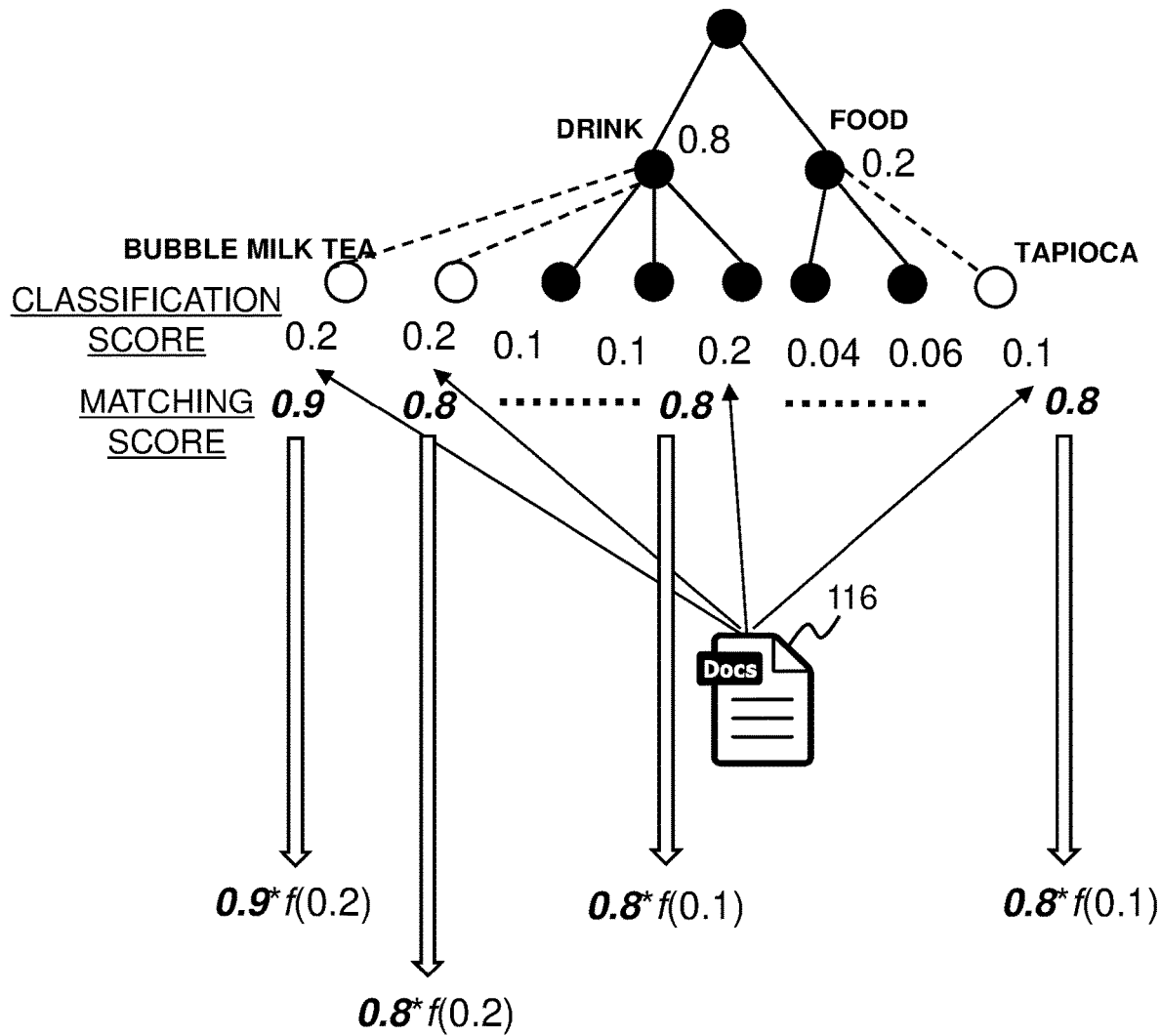
FIG. 9 It depicts an explanatory diagram showing an example of a process of calculating the final classification score.

As illustrated in FIG. 9, the final classification score calculator 90 calculates the final classification score based on the calculated classification score and matching score. The final classification score calculator 90 may calculate a value converted from the classification score using the function f: [0, 1]->[0, 1] as illustrated in FIG. 9, and multiply the calculated value by the matching score to calculate the final classification score. Thus, the function f can be said to be a function that determines how the classification score is used to calculate the final classification score.

Figure 10:
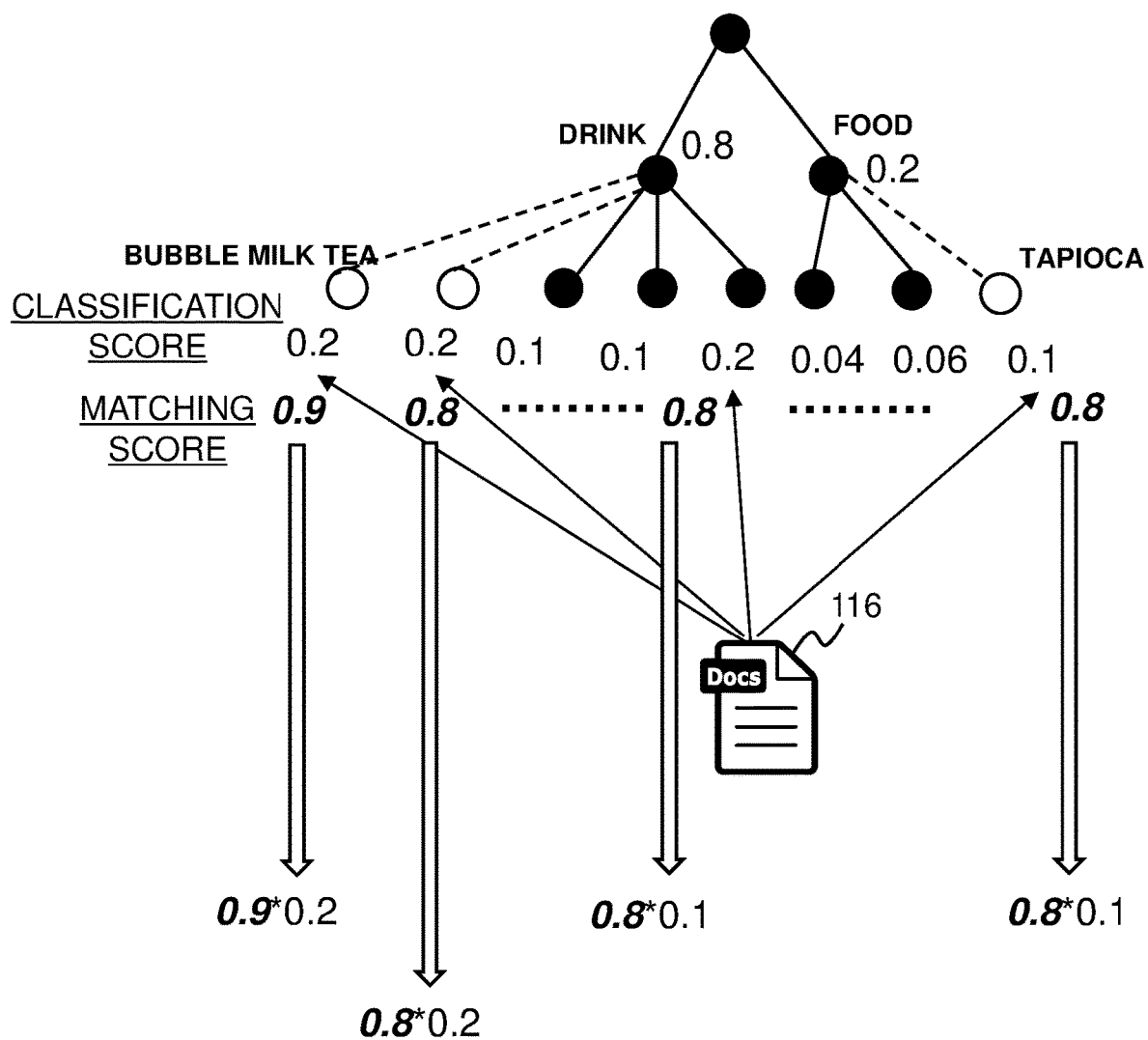
FIG. 10 It depicts an explanatory diagram showing an example of a process of calculating the final classification score.

FIG. 10 is an explanatory diagram showing an example of using the identity mapping I as the function f. The example shown in FIG. 10 is equivalent to the process of calculating the final classification score by multiplying the classification score and the matching score.

Figure 11:
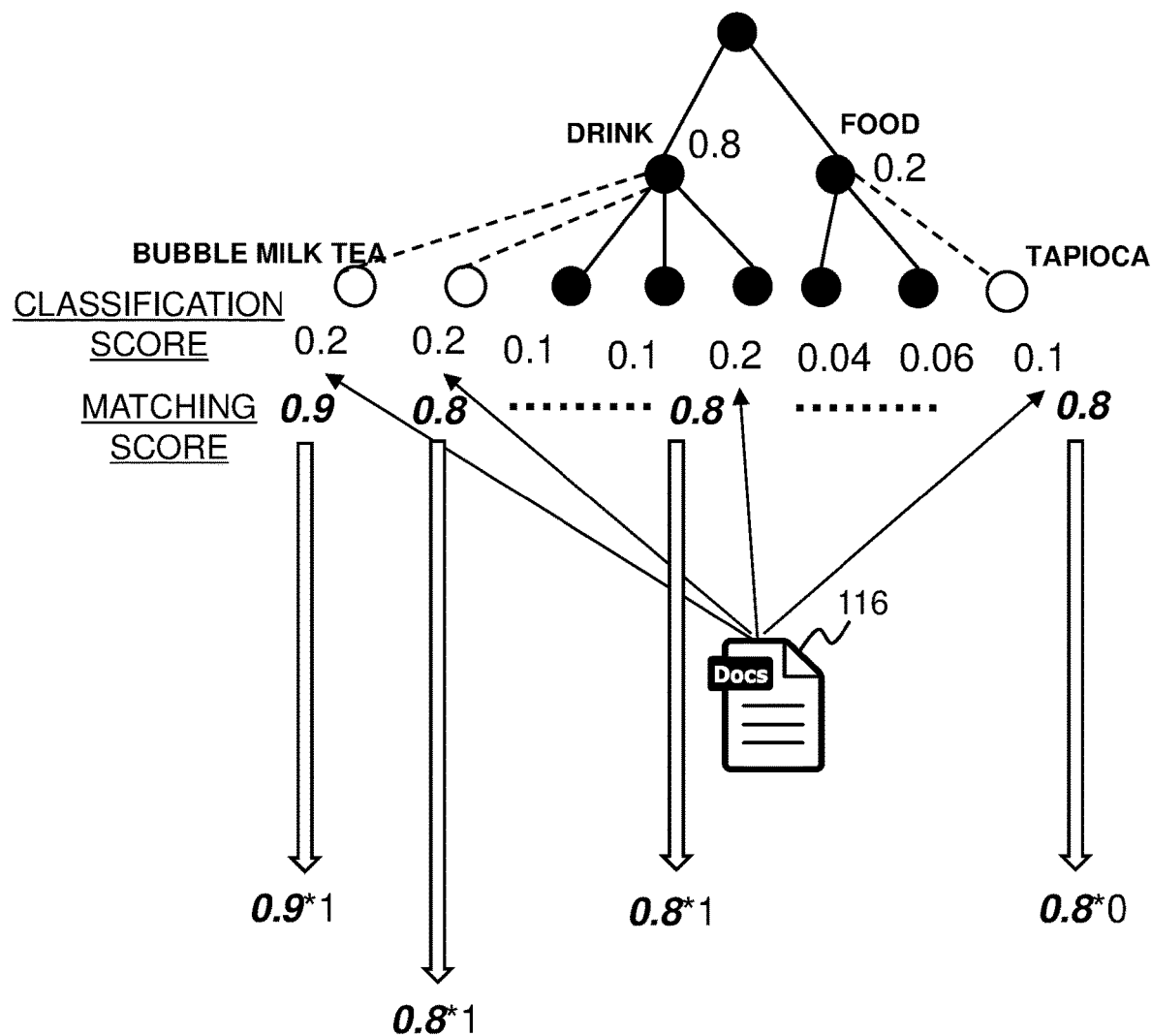
FIG. 11 It depicts an explanatory diagram showing an example of a process of calculating the final classification score.

FIG. 11 is an explanatory diagram showing an example of using the step function θ as the function f. When x is a document sample and y is a class label, the step function θ is represented by Equation 2 shown in the example below, for example. For example, in the example shown in FIG. 11, the final classification score for the class "bubble milk tea" is calculated to be 0.9, and the final classification score for the class "tapioca" is calculated to be 0.

[Math. 2]

$$f = \theta(h(x,y) - ths2) \quad \text{(Equation 2)}$$

In Equation 2, h is a function calculating the classification score and used by the unseen class score calculator 70 when calculating the classification score. In addition, ths2 is a threshold value of the step function, which is predetermined by the user, etc. The example shown in FIG. 11 is a case where the threshold value ths2=0.15. For classes with a classification score smaller than the threshold ths2, the classification score is replaced with 0. By using the step function as described above, it is possible to narrow down the candidate classes to be classified to those with high classification scores.

For example, although a classification score of the unseen class can be calculated by the unseen class score calculator 70, the classification scores of child nodes under the same parent node are calculated equally. Therefore, it is difficult to determine to which child node the test data should be classified based on only this classification score. On the other hand, the matching score calculator 80 calculates the semantic or string similarities between the test data and the class labels. Therefore, the final classification score calculator 90 calculates the final classification score by considering both this classification score and the matching score. This makes it possible to calculate different classification scores (final classification scores) for child nodes of unseen classes under the same parent node.

The output unit 100 outputs the classification results of the test data. Specifically, the output unit 100 determines the class with the highest final classification score as the class to which the test data is classified and outputs information on that class. For example, the output unit 100 may output a class label for the class to which the test data has been classified, or may display the portion in the hierarchical structure corresponding to the class to which the test data has been classified in a manner that allows identification with other classes. The output unit 100 may also output the classification score calculated in the process described above.

The test data is classified by the test data input unit 50, the classification score calculator 60, the unseen class score calculator 70, the matching score calculator 80, the final classification score calculator 90, and the output unit 100. Therefore, the device 3 including the test data input unit 50, the classification score calculator 60, the unseen class score calculator 70, the matching score calculator 80, the final classification score calculator 90, and the output unit 100 can be called a classification device.

The training data input unit 20, the hierarchical classifier training unit 30, the matcher training unit 40, the test data input unit 50, the classification score calculator 60, the unseen class score calculator 70, the matching score calculator 80, the final classification score calculator 90, and the output unit 100 are realized by a computer processor (for example, CPU (Central Processing Unit)) that operates according to a program.

For example, a program may be stored in the storage unit 10, and the processor may read the program and operate according to the program as the training data input unit 20, the hierarchical classifier training unit 30, the matcher training unit 40, the test data input unit 50, the classification score calculator 60, the unseen class score calculator 70, the matching score calculator 80, the final classification score calculator 90, and the output unit 100. The functions of the classification system 1 may be provided in a SaaS (Software as a Service) format.

Each of the training data input unit 20, the hierarchical classifier training unit 30, the matcher training unit 40, the test data input unit 50, the classification score calculator 60, the unseen class score calculator 70, the matching score calculator 80, the final classification score calculator 90, and the output unit 100 may be realized by dedicated hardware.

Some or all of the components of each device may be realized by general-purpose or dedicated circuit (circuitry), processors, etc., or a combination thereof. They may be configured by a single chip or by multiple chips connected through a bus. Some or all of the components of each device may be realized by a combination of the above-mentioned circuit, etc. and a program.

When some or all of the components of the classification system 1 are realized by multiple information processing devices, circuits, etc., the multiple information processing devices, the circuits, etc. may be arranged in a centralized or distributed manner. For example, the information processing devices, the circuits, etc., may be realized as a client-server system, a cloud computing system, or the like, each of which is connected through a communication network.

Figure 12:
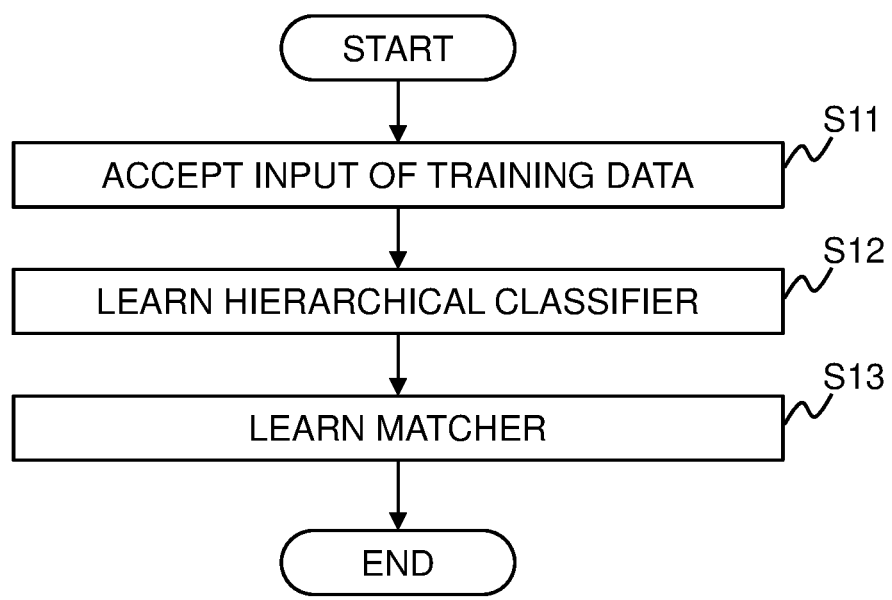
FIG. 12 It depicts a flowchart showing an example of an operation of the learning process.

Next, the operation of the classification system 1 will be explained. FIG. 12 is a flowchart showing an example of an operation of the learning process in the classification system 1. The training data input unit 20 accepts input of training data (step S11). The hierarchical classifier learning unit 30 learns a hierarchical classifier to classify test data based on the input training data (step S12). The matcher learning unit 40 learns a matcher that outputs a matching score according to similarity between a class label and a document sample (step S13). The learned hierarchical classifier and the matcher are stored in the storage unit 10.

Figure 13:
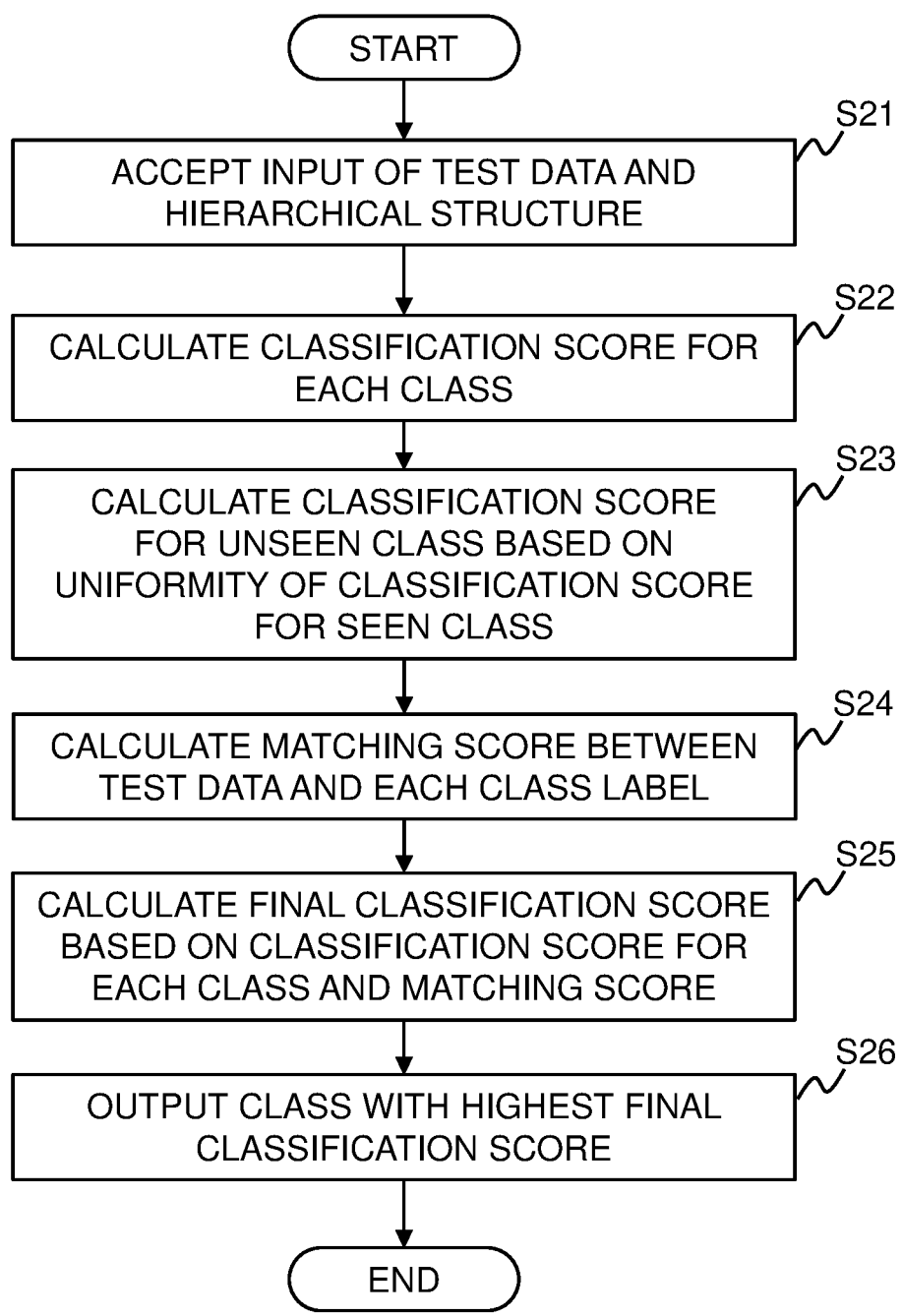
FIG. 13 It depicts an explanatory diagram showing an example of a classification process.

FIG. 13 is an explanatory diagram showing an example of a classification process in the classification system 1. The test data input unit 50 accepts inputs of test data and a hierarchical structure (step S21). The classification score calculator 60 applies the input test data to the hierarchical classifier to calculate a classification score for each class (step S22). The unseen class score calculator 70 calculates classification scores for unseen classes based on uniformity of the classification scores for seen classes (step S23).

The matching score calculator 80 calculates a matching score between the test data and each class label (step S24). The final classification score calculator 90 calculates a final classification score based on the classification score for each class and the matching score (step S25). The output unit 100 outputs the class with the highest final classification score as the class to which the test data is classified (step S26).

As described above, in this exemplary embodiment, the test data input unit 50 and the classification score calculator 60 accept input of the test data, the hierarchical structure, and the classification scores that are classified into respective classes in the hierarchical structure. The unseen class score calculator 70 calculates the classification scores of the unseen classes based on uniformity of the classification scores of each seen classes in the hierarchical structure. The matching score calculator 80 calculates the matching score between the test data and the class label of the seen class or the class label of the unseen class. Then, the final classification score calculator 90 calculates the final classification score so that the larger the classification score and the matching score, the larger the final classification score. Thus, the data to be classified can be appropriately classified even for unseen classes for which no classified document data exists.

For example, in a general hierarchical classification, test data in seen classes can classified with good accuracy, and test data can be also mapped to intermediate nodes (coarse classification) with good accuracy. However, it is difficult to classify test data into unseen classes for which there is no training data. In addition, since the method of matching a class label to a document sample uses information indicating the similarity between the class label and the document, it is possible to classify test data to unseen classes for which no training data exists. However, because classification is based solely on the similarity to the label, classification accuracy is generally low.

To address the above problem, since the classification system 1 of this exemplary embodiment performs classification using hierarchical classification and matching together, it is expected to compensate for weaknesses of both and improve the classification accuracy of unseen class data while maintaining high classification accuracy of seen class data.

For example, it is not easy to distinguish between "tapioca" and "bubble milk tea" by matching alone. In contrast, since hierarchical classification allows classification of drinks and food, it is reduced to regard data on "bubble latte", for example, as "tapioca" because "bubble latte" is identified as a drink by hierarchical classification.

Hereinafter, an example of the classification system 1 of this exemplary embodiment will be explained. As an example of applying the classification system 1 of this exemplary embodiment, a situation can be considered where, among all classes, most classes include labeled product document (for example, a document including a product name and a product description) data, but some classes do not include labeled product document data.

In this situation, it is assumed that new unlabeled product document data is obtained apart from the data described above. In this case, it is necessary to classify this unlabeled product document data into one of the classes in the set hierarchical structure and assign a single label to it.

To achieve this, first, the training data input unit 20 accepts input of the hierarchical structure and training data, i.e., labeled product document data. Using the input training data, the hierarchical classifier training unit 30 learns the classifier, and the matcher training unit 40 learns the matcher. The classification system 1 then classifies the unlabeled product document data based on the classification process as illustrated in FIG. 13.

This process allows for the labeling of unlabeled product document data. In particular, it will be possible to correctly classify test data that should be classified into unseen classes, which could not be correctly classified using only a general hierarchical classifier.

Figure 14:
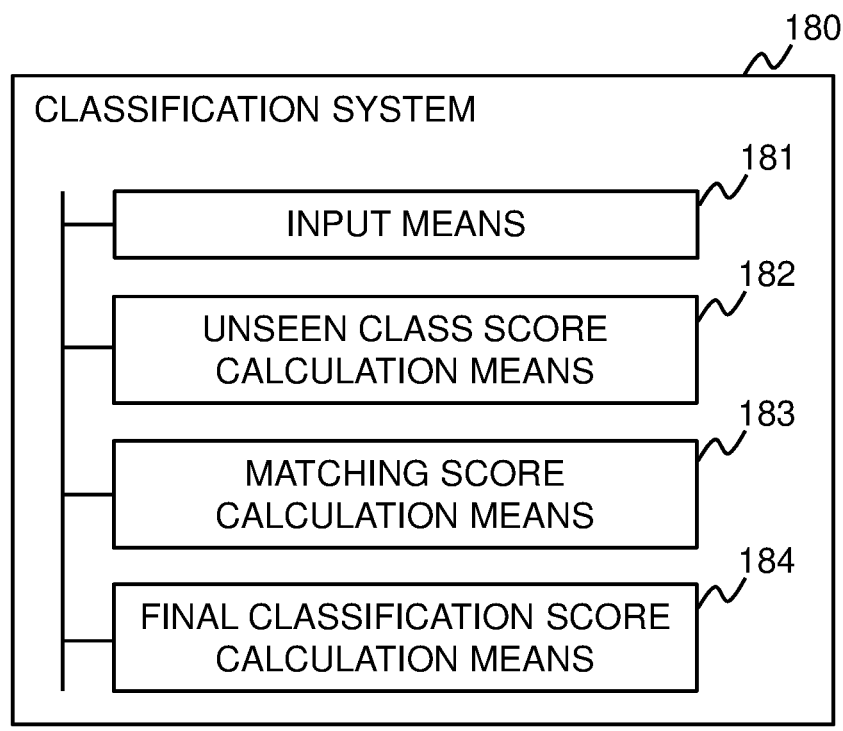
FIG. 14 It depicts a block diagram showing an overview of the classification system according to the present invention.

Next, an overview of the invention will be explained. FIG. 14 is a block diagram showing an overview of the classification system according to the present invention. The classification system 180 (for example, the classification system 1) according to the present invention includes input means 181 (for example, the test data input unit 50 and the classification score calculator 60) for accepting inputs of test data that is document data to be classified, a hierarchical structure in which a node of bottom layer represents a class being a classification destination, and a classification score of a seen class for which the document data already classified exists as the classification score indicating a probability that the test data is classified into each class in the hierarchical structure, unseen class score calculation means 182 (for example, the unseen class score calculator 70) for calculating the classification score of an unseen class for which the document data already classified does not exist based on uniformity of the classification score of each seen class in the hierarchical structure, matching score calculation means 183 (for example, the matching score calculator 80) for calculating a matching score indicating similarity between the test data and a class label of the seen class or a class label of the unseen class, and final classification score calculation means 184 (for example, the final classification score calculator 90) for calculating a final classification score indicating a probability that the test data is classified into the class so that the larger the classification score of the seen class or the classification score of the unseen class, and the matching score, the larger the final classification score.

Such a configuration makes it possible to also appropriately classify data to be classified into an unseen class for which no classified document data exists.

Specifically, the unseen class score calculation means 182 may calculate the classification score of the unseen class so that the more uniform the classification score of each seen class, the higher the classification score of the unseen class (for example, using the above Equation 1).

The matching score calculation means 183 may calculate the matching score by applying the class label of each class and the test data to a matcher (for example, the matcher illustrated in FIG. 5) which inputs the class label indicating linguistic meaning of the class and a document sample and outputs the matching score corresponding to the similarity between the class label and the document sample.

Specifically, the matching score calculation means 183 may calculate the matching score by applying the class label of each class and the test data to a matcher which calculates the matching score using a sigmoid function that takes as an argument a weighted linear sum of at least one of similarities in either or both semantic similarities (for example, cosine similarity, Euclidean distance, etc.) and similarities (for example, the longest common substring length, an edit distance, etc.) of included character strings.

The final classification score calculation means 184 may calculate the final classification score by multiplying a value calculated by applying the classification score for each class and the matching score to a function (for example, identity mapping I, a step function θ) that takes the classification score as an input and outputs the value determined based on magnitude of the classification score.

The unseen class score calculation means 182 may allocate the classification scores of the seen classes under a parent node of the unseen classes for which the classification scores are calculated to the classification scores of the unseen class so that a sum of the classification scores of the seen classes under the parent node and a sum of the classification scores of the unseen classes under the parent node is equal.

Specifically, the unseen class score calculation means 182 may allocate the classification scores of the seen classes equally to the classification scores of the unseen classes.

Figure 15:
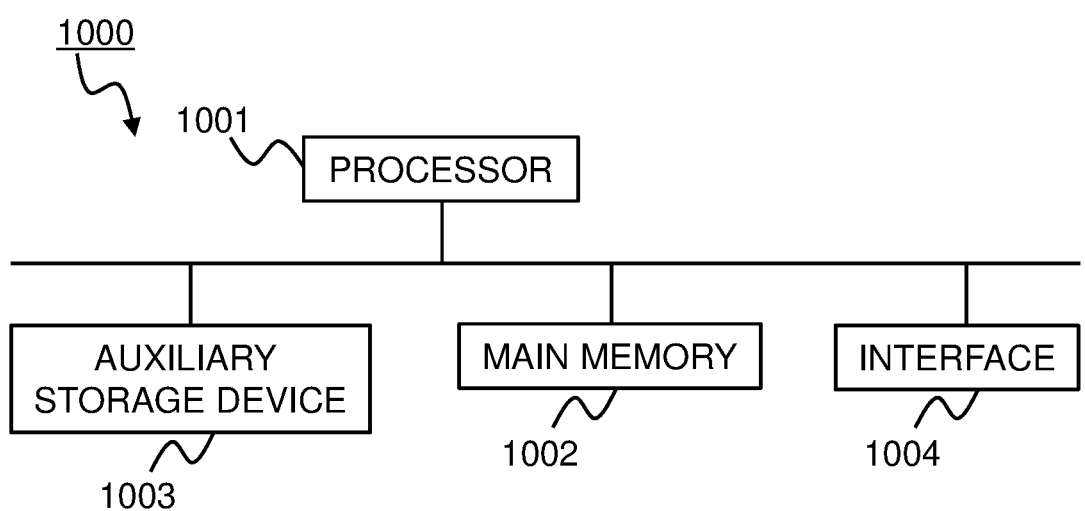
FIG. 15 It depicts a summarized block diagram showing a configuration of a computer for at least one exemplary embodiment.

FIG. 15 is a summarized block diagram showing a configuration of a computer for at least one exemplary embodiment. The computer 1000 includes a processor 1001, a main memory 1002, an auxiliary memory 1003, and an interface 1004.

The classification system 180 described above is implemented in a computer 1000. The operation of each of the above described processing parts is stored in the auxiliary storage 1003 in the form of a program (classification program). The processor 1001 reads the program from the auxiliary storage 1003, develops it to the main memory 1002, and executes the above described processing according to the program.

In at least one exemplary embodiment, the auxiliary memory 1003 is an example of a non-transitory tangible medium. Other examples of a non-transitory tangible medium include a magnetic disk, an optical magnetic disk, a CD-ROM (Compact Disc Read-only memory), a DVD-ROM (Read only memory), semiconductor memory, and the like. When the program is delivered to the computer 1000 through a communication line, the computer 1000 receiving the delivery may extract the program into the main memory 1002 and execute the above processing.

The program may be a program for realizing a part of the above described functions. Further, the program may be a so-called difference file (difference program) that realizes the aforementioned functions in combination with other programs already stored in the auxiliary memory 1003.

A part of or all of the above exemplary embodiments may also be described as, but not limited to, the following supplementary notes.

(Supplementary note 1) A classification system comprising:
 input means for accepting inputs of test data that is document data to be classified, a hierarchical structure in which a node of bottom layer represents a class being a classification destination, and a classification score of a seen class for which the document data already classified exists as the classification score indicating a probability that the test data is classified into each class in the hierarchical structure;
 unseen class score calculation means for calculating the classification score of an unseen class for which the document data already classified does not exist based on uniformity of the classification score of each seen class in the hierarchical structure;
 matching score calculation means for calculating a matching score indicating similarity between the test data and a class label of the seen class or a class label of the unseen class; and
 final classification score calculation means for calculating a final classification score indicating a probability that the test data is classified into the class so that the larger the classification score of the seen class or the classification score of the unseen class, and the matching score, the larger the final classification score.

(Supplementary note 2) The classification system according to Supplementary note 1, wherein
 the unseen class score calculation means calculates the classification score of the unseen class so that the more uniform the classification score of each seen class, the higher the classification score of the unseen class.

(Supplementary note 3) The classification system according to Supplementary note 1 or 2, wherein
 the matching score calculation means calculates the matching score by applying the class label of each class and the test data to a matcher which inputs the class label indicating linguistic meaning of the class and a document sample and outputs the matching score corresponding to the similarity between the class label and the document sample.

(Supplementary note 4) The classification system according to any one of Supplementary notes 1 to 3, wherein
 the matching score calculation means calculates the matching score by applying the class label of each class and the test data to a matcher which calculates the matching score using a sigmoid function that takes as an argument a weighted linear sum of at least one of similarities in either or both semantic similarities and similarities of included character strings.

(Supplementary note 5) The classification system according to any one of Supplementary notes 1 to 4, wherein
 the final classification score calculation means calculates the final classification score by multiplying a value calculated by applying the classification score for each class and the matching score to a function that takes the classification score as an input and outputs the value determined based on magnitude of the classification score.

(Supplementary note 6) The classification system according to any one of Supplementary notes 1 to 5, wherein
 the unseen class score calculation means allocates the classification scores of the seen classes under a parent node of the unseen classes for which the classification scores are calculated to the classification scores of the unseen class so that a sum of the classification scores of the seen classes under the parent node and a sum of the classification scores of the unseen classes under the parent node is equal.

(Supplementary note 7) The classification system according to Supplementary note 6, wherein
 the unseen class score calculation means allocates the classification scores of the seen classes equally to the classification scores of the unseen classes.

(Supplementary note 8) A classification method comprising:
 accepting inputs of test data that is document data to be classified, a hierarchical structure in which a node of bottom layer represents a class being a classification destination, and a classification score of a seen class for which the document data already classified exists as the classification score indicating a probability that the test data is classified into each class in the hierarchical structure;
 calculating the classification score of an unseen class for which the document data already classified does not exist based on uniformity of the classification score of each seen class in the hierarchical structure;
 calculating a matching score indicating similarity between the test data and a class label of the seen class or a class label of the unseen class; and
 calculating a final classification score indicating a probability that the test data is classified into the class so that the larger the classification score of the seen class or the classification score of the unseen class, and the matching score, the larger the final classification score.

(Supplementary note 9) The classification method according to Supplementary note 8, wherein
the classification score of the unseen class is calculated so that the more uniform the classification score of each seen class, the higher the classification score of the unseen class.

(Supplementary note 10) A program recording medium storing a classification program wherein
the classification program causes a computer to execute:
input process of accepting inputs of test data that is document data to be classified, a hierarchical structure in which a node of bottom layer represents a class being a classification destination, and a classification score of a seen class for which the document data already classified exists as the classification score indicating a probability that the test data is classified into each class in the hierarchical structure;
unseen class score calculation process of calculating the classification score of an unseen class for which the document data already classified does not exist based on uniformity of the classification score of each seen class in the hierarchical structure;
matching score calculation process of calculating a matching score indicating similarity between the test data and a class label of the seen class or a class label of the unseen class; and
final classification score calculation process of calculating a final classification score indicating a probability that the test data is classified into the class so that the larger the classification score of the seen class or the classification score of the unseen class, and the matching score, the larger the final classification score.

(Supplementary note 11) The program recording medium according to Supplementary note 10, wherein
in the unseen class score calculation process, the classification program causes the computer to execute calculating the classification score of the unseen class so that the more uniform the classification score of each seen class, the higher the classification score of the unseen class.

(Supplementary note 12) A classification program causing a computer to execute:
input process of accepting inputs of test data that is document data to be classified, a hierarchical structure in which a node of bottom layer represents a class being a classification destination, and a classification score of a seen class for which the document data already classified exists as the classification score indicating a probability that the test data is classified into each class in the hierarchical structure;
unseen class score calculation process of calculating the classification score of an unseen class for which the document data already classified does not exist based on uniformity of the classification score of each seen class in the hierarchical structure;
matching score calculation process of calculating a matching score indicating similarity between the test data and a class label of the seen class or a class label of the unseen class; and
final classification score calculation process of calculating a final classification score indicating a probability that the test data is classified into the class so that the larger the classification score of the seen class or the classification score of the unseen class, and the matching score, the larger the final classification score.

(Supplementary note 13) The classification program according to Supplementary note 12, wherein
in the unseen class score calculation process, the classification program causes the computer to execute calculating the classification score of the unseen class so that the more uniform the classification score of each seen class, the higher the classification score of the unseen class.

Although the invention of the present application has been described above with reference to exemplary embodiments, the present invention is not limited to the above exemplary embodiments. Various changes can be made to the configuration and details of the present invention that can be understood by those skilled in the art within the scope of the present invention.

REFERENCE SIGNS LIST

1 Classification system
10 Storage unit
20 Training data input unit
30 Hierarchical classifier learning unit
40 Matcher training unit
50 Test data input unit
60 Classification score calculator
70 Unseen class score calculator
80 Matching score calculator
90 Final classification score calculator
100 Output unit

What is claimed is:
1. A classification system comprising:
a memory storing instructions; and
one or more processors configured to execute the instructions to:
accept input of test data that is document data to be classified, a hierarchical structure in which a node of a bottom layer represents a target class, and a classification score of each of a plurality of seen classes for the document data, wherein the classification score of each seen class indicates a probability that the test data is correctly classified into the each seen class;
calculate a classification score of each of a plurality of unseen classes for the document data based on uniformity of the classification score of each seen class;
allocate the classification scores of the seen classes under a parent node of the unseen classes to the classification scores of the unseen class such that a sum of the classification scores of the seen classes and the unseen classes under the parent node are equal to the classification scores of the parent node;
for each class of the seen classes and the unseen classes, calculate a matching score indicating similarity between the test data and a class label of the each class, by applying the class label of each class and the test data to a matcher which inputs the class label indicating linguistic meaning of the each class and a document sample and outputs the matching score corresponding to a similarity between the class label and the document sample; and
calculate a final classification score indicating a probability that the test data is classified into a class selected from the seen classes and the unseen classes such that the larger the classification score of the selected class and the larger the matching score for the selected class are, the larger the final classification score is.

2. The classification system according to claim 1, wherein the processor is configured to execute the instructions to calculate the classification score of each unseen class so that the more uniform the classification score of each seen class is, the higher the classification score of the each unseen class is.

3. The classification system according to claim 1, wherein the processor is configured to execute the instructions to calculate the matching score by applying the class label of each class and the test data to a matcher which calculates the matching score using a sigmoid function that takes as an argument a weighted linear sum of at least one of similarities of either or both semantic similarities and similarities of included character strings.

4. The classification system according to claim 1, wherein the processor is configured to execute the instructions to calculate the final classification score by multiplying a value calculated by applying the classification score for each class and the matching score for the each class to a function that takes the classification score as an input and outputs the value that is determined based on a magnitude of the classification score.

5. The classification system according to claim 1, wherein the processor is configured to execute the instructions to allocate the classification scores of the seen classes equally to the classification scores of the unseen classes.

6. A classification method performed by a computer and comprising:
   accepting input of test data that is document data to be classified, a hierarchical structure in which a node of a bottom layer represents a target class, and a classification score of each of a plurality of seen classes for the document data, wherein the classification score of each seen class indicates a probability that the test data is correctly classified into the each seen class;
   calculating a classification score of each of a plurality of unseen classes for the document data based on uniformity of the classification score of each seen class;
   allocating the classification scores of the seen classes under a parent node of the unseen classes to the classification scores of the unseen class such that a sum of the classification scores of the seen classes and the unseen classes under the parent node are equal to the classification scores of the parent node;
   for each class of the seen classes and the unseen classes, calculating a matching score indicating similarity between the test data and a class label of the each class, by applying the class label of each class and the test data to a matcher which inputs the class label indicating linguistic meaning of the each class and a document sample and outputs the matching score corresponding to a similarity between the class label and the document sample; and
   calculating a final classification score indicating a probability that the test data is classified into a class selected from the seen classes and the unseen classes such that the larger the classification score of the selected class and the larger the matching score for the selected class are, the larger the final classification score is.

7. The classification method according to claim 6, wherein the classification score of each unseen class is calculated so that the more uniform the classification score of each seen class is, the higher the classification score of the each unseen class is.

8. A non-transitory computer readable information recording medium storing a classification program executable by a processor to perform a method comprising:
   accepting input of test data that is document data to be classified, a hierarchical structure in which a node of a bottom layer represents a target class, and a classification score of each of a plurality of seen classes for the document data, wherein the classification score of each seen class indicates a probability that the test data is correctly classified into the each seen class;
   calculating a classification score of each of a plurality of unseen classes for the document data based on uniformity of the classification score of each seen class;
   allocating the classification scores of the seen classes under a parent node of the unseen classes to the classification scores of the unseen class such that a sum of the classification scores of the seen classes and the unseen classes under the parent node are equal to the classification scores of the parent node;
   for each class of the seen classes and the unseen classes, calculating a matching score indicating similarity between the test data and a class label of the each class, by applying the class label of each class and the test data to a matcher which inputs the class label indicating linguistic meaning of the each class and a document sample and outputs the matching score corresponding to a similarity between the class label and the document sample; and
   calculating a final classification score indicating a probability that the test data is classified into a class selected from the seen classes and the unseen classes such that the larger the classification score of the selected class and the larger the matching score for the selected class are, the larger the final classification score is.

9. The non-transitory computer readable information recording medium according to claim 8, wherein the method further comprises calculating the classification score of each unseen class so that the more uniform the classification score of each seen class is, the higher the classification score of the each unseen class is.

* * * * *